US009323924B1

(12) United States Patent
Roundy et al.

(10) Patent No.: US 9,323,924 B1
(45) Date of Patent: Apr. 26, 2016

(54) SYSTEMS AND METHODS FOR ESTABLISHING REPUTATIONS OF FILES

(71) Applicant: Symantec Corporation, Mountain View, CA (US)

(72) Inventors: Kevin Alejandro Roundy, El Segundo, CA (US); Acar Tamersoy, Atlanta, GA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 20 days.

(21) Appl. No.: 14/274,420

(22) Filed: May 9, 2014

(51) Int. Cl.
*G06F 21/55* (2013.01)
*G06F 11/00* (2006.01)

(52) U.S. Cl.
CPC .................................... *G06F 21/552* (2013.01)

(58) Field of Classification Search
CPC ....... G06F 21/55; G06F 21/552; G06F 21/56; G06F 21/561; G06F 21/562; G06F 21/563; G06F 21/564; G06F 21/565; G06F 21/566; G06F 21/568
See application file for complete search history.

(56) References Cited

U.S. PATENT DOCUMENTS

| | | | | |
|---|---|---|---|---|
| 7,784,098 | B1 * | 8/2010 | Fan et al. | 726/25 |
| 7,823,205 | B1 * | 10/2010 | Isenberg et al. | 726/23 |
| 8,250,657 | B1 * | 8/2012 | Nachenberg | G06F 21/51 705/50 |
| 8,312,537 | B1 * | 11/2012 | Nachenberg et al. | 726/22 |
| 8,341,745 | B1 | 12/2012 | Chau et al. | |
| 8,381,289 | B1 * | 2/2013 | Pereira et al. | 726/22 |
| 8,413,244 | B1 * | 4/2013 | Nachenberg | 726/22 |
| 8,499,063 | B1 * | 7/2013 | Satish et al. | 709/223 |
| 8,510,836 | B1 * | 8/2013 | Nachenberg | 726/23 |
| 8,566,932 | B1 * | 10/2013 | Hotta et al. | 726/22 |
| 8,671,449 | B1 * | 3/2014 | Nachenberg | 726/24 |
| 8,839,432 | B1 * | 9/2014 | Patil | 726/24 |
| 9,065,849 | B1 * | 6/2015 | Rivera et al. | |
| 2003/0154396 | A1 * | 8/2003 | Godwin et al. | 713/201 |
| 2005/0283837 | A1 * | 12/2005 | Olivier et al. | 726/24 |
| 2006/0137010 | A1 * | 6/2006 | Kramer et al. | 726/22 |
| 2007/0028304 | A1 * | 2/2007 | Brennan | 726/24 |
| 2008/0022384 | A1 * | 1/2008 | Yee et al. | 726/11 |
| 2008/0134046 | A1 * | 6/2008 | Gray et al. | 715/736 |
| 2009/0165131 | A1 * | 6/2009 | Treadwell | 726/22 |
| 2009/0282476 | A1 * | 11/2009 | Nachenberg et al. | 726/22 |
| 2010/0083376 | A1 * | 4/2010 | Pereira et al. | 726/22 |
| 2010/0192196 | A1 * | 7/2010 | Lee | 726/1 |
| 2011/0040825 | A1 * | 2/2011 | Ramzan et al. | 709/203 |
| 2011/0067101 | A1 * | 3/2011 | Seshadri | G06F 21/552 726/22 |
| 2012/0079596 | A1 * | 3/2012 | Thomas et al. | 726/24 |
| 2015/0007315 | A1 * | 1/2015 | Rivera et al. | 726/23 |
| 2015/0199511 | A1 * | 7/2015 | Faile et al. | 726/25 |

OTHER PUBLICATIONS

Chau, Duen H., et al., "Polonium: Tera-Scale Graph Mining for Malware Detection", http://www.ml.cmu.edu/research/dap-papers/dap-chau.pdf, as accessed Apr. 16, 2014, KDD-LDMTA'10, Washington, DC, USA, (Jul. 25, 2010).

\* cited by examiner

*Primary Examiner* — Darren B Schwartz

(74) *Attorney, Agent, or Firm* — ALG Intellectual Property, LLC

(57) ABSTRACT

A disclosed method may include (1) tracking the health of a computing system over time by calculating, for each of several time periods, a health metric that indicates the computing system's health during the time period, (2) evaluating the health metrics of the time periods to identify an anomalous time period during which the health of the computing system changed, (3) locating one or more files that were present on the computing system during the anomalous time period and absent from the computing system during one or more other time periods, and (4) basing a reputation for the file(s) on an association between the file(s) and the computing system that includes the anomalous time period and excludes the other time period. Various other methods, systems, and computer-readable media are also disclosed.

20 Claims, 7 Drawing Sheets

SYSTEMS AND METHODS FOR ESTABLISHING REPUTATIONS OF FILES

BACKGROUND

Approaches to detecting malware have changed along with the approaches to creating malware. Early efforts focused on identifying each new virus as it proliferated from computer to computer via floppy disk. With the growth of the Internet and World Wide Web came new mechanisms for malware to be transmitted and new vulnerabilities for malware developers to exploit, and anti-malware system developers responded with new techniques for detecting and eradicating malware infections.

One recent trend in malware detection is the use of reputation. Highly prevalent files, such as executable program files for common software applications, may be identified as "known safe" by anti-malware systems, partly because of their prevalence, but also because their provenance has been established and they have been thoroughly tested. Less prevalent files present a greater challenge. A new, previously-unencountered file appearing on a computer hard drive may be a piece of custom software a user has created for their own use or a new instantiation of polymorphic malware. It may also be part of a targeted attack—a program custom designed to take advantage of resources and vulnerabilities within an organization to steal valuable data, compromise security systems, or commit sabotage.

One factor that may be considered when evaluating less-prevalent files is the reputation of the computing device on which they are found. A computer may acquire a bad reputation through frequent malware infection because, for example, it is missing an operating system patch that closes a security hole, or because the user habitually visits websites that spread malware. Computer reputation, however, may be an imprecise factor in determining the safety of a file on the computer. Accordingly, the instant disclosure identifies and addresses a need for additional and improved systems and methods for establishing reputations of files.

SUMMARY

As will be described in greater detail below, the instant disclosure describes various systems and methods for establishing reputations of files by tracking the health of a computing system over time. Systems and methods described herein may identify changes in a computing system's health and then base the reputation of files on the health of the computing system during the time that the files were present on the computing system.

In one example, a computer-implemented method for establishing reputations of files may include (1) tracking the health of a computing system over time by calculating, for each of several time periods, a health metric that indicates the computing system's health during the time period, (2) evaluating the health metrics of the time periods to identify an anomalous time period during which the health of the computing system changed, (3) locating one or more files that were present on the computing system during the anomalous time period and absent from the computing system during one or more other time periods, and (4) basing a reputation for the file(s) on an association between the file(s) and the computing system that includes the anomalous time period and excludes the other time period such that the reputation for the file(s) is based at least in part on the health metric for the anomalous time period and is not based on the health metric for the other time period.

In at least one embodiment, (1) the health metric for the anomalous time period indicates that the computing system had poor health during the anomalous time period, (2) the health metric for the other time period indicates that the computing system had good health during the other time period, and (3) the reputation for the file indicates that the file is potentially malicious. In some embodiments, (1) the health metrics indicate that the health of the computing system is good before and after the anomalous time period and (2) the anomalous time period may include a period of time that is short relative to the other period of time and indicate a spike of poor health on the computing system.

According to various embodiments, (1) the health metric for the anomalous time period indicates that the computing system had good health during the anomalous time period, (2) the health metric for the other time period indicates that the computing system had poor health during the other time period, and (3) the reputation for the file indicates that the file is safe. In one embodiment, (1) a reputation of the file is unknown before the file is associated with the anomalous time period of the computing system and (2) calculating the health metric that indicates the computing system's health during the anomalous time period may include (a) identifying at least one additional file present on the computing system during the time period, (b) identifying a reputation for the additional file, and (c) basing the health metric for the anomalous time period, at least in part, on the reputation of the additional file.

In some examples, basing a reputation for the file on the association between the file and the computing system during the anomalous time period may include (1) generating a graph including a file node representing the file and a set of time period nodes representing each of the time periods, where time period nodes are connected by lines (called "edges") to the file node according to the time period the file was present on the computing system, (2) determining a prior for each time period node in the graph based on an assessment of the likelihood that the computing system may become infected by malware during the time period, (3) determining a prior for the file node in the graph based on an assessment of a likelihood of the file being malware, (4) determining an edge potential for each edge in the graph based on a relationship between nodes connected by the edge, (5) iteratively propagating a probability of the file being malware among the nodes by transmitting messages along the edges in the graph, where a message transmitted by a node is generated based on the prior of the node and messages received by the node during any previous iteration, and (6) determining a reputation for the file based on the probability associated with the corresponding file node.

In one embodiment, iteratively propagating the probabilities terminates when (1) the probability for the file node converges within a threshold value, (2) a predetermined number of iterations have been completed, and/or (3) a true positive rate of malware is correctly classified based on the probability associated with the corresponding file node in the graph. In one embodiment, the graph may include time period nodes representing time periods from multiple computing systems where the file was present during at least one time period. In some examples, tracking the health of the computing system over time may include (1) calculating the health metric for the computing system for a first fixed time period, (2) calculating the health metric for the computing system for a second fixed time period, (3) determining that the health metric for the second time period does not vary from the health metric of the first time period beyond a threshold, and (4) in response to determining that the health metrics of the two time periods do not vary beyond a threshold, combining the time periods into a single time period.

In one embodiment, a system for implementing the above-described method may include several modules stored in memory, such as (1) a tracking module that tracks the health of a computing system over time by calculating, for each of several time periods, a health metric that indicates the computing system's health during the time period, (2) an evaluation module that evaluates the health metrics during the time periods to identify an anomalous time period where the health of the computing system changed, (3) a identification module that locates one or more files present on the computing system during the anomalous time period and absent from the computing system during at least one other time period, and (4) a reputation module that bases a reputation for the file on an association between the file and the computing system that includes the anomalous time period and excludes the other time period such that the reputation for the file is based at least in part on the health metric for the anomalous time period and is not based on the health metric for the other time period. The system may also include at least one physical processor configured to execute the tracking module, the evaluation module, the identification module, and the reputation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) track the health of a computing system over time by calculating, for each of several time periods, a health metric that indicates the computing system's health during the time period, (2) evaluate the health metrics during the time periods to identify an anomalous time period during which the health of the computing system changed, (3) locate at least one file present on the computing system during the anomalous time period and absent from the computing system during at least one other time period, and (4) base a reputation for the file on an association between the file and the computing system that includes the anomalous time period and excludes the other time period such that the reputation for the file is based at least in part on the health metric for the anomalous time period and is not based on the health metric for the other time period.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
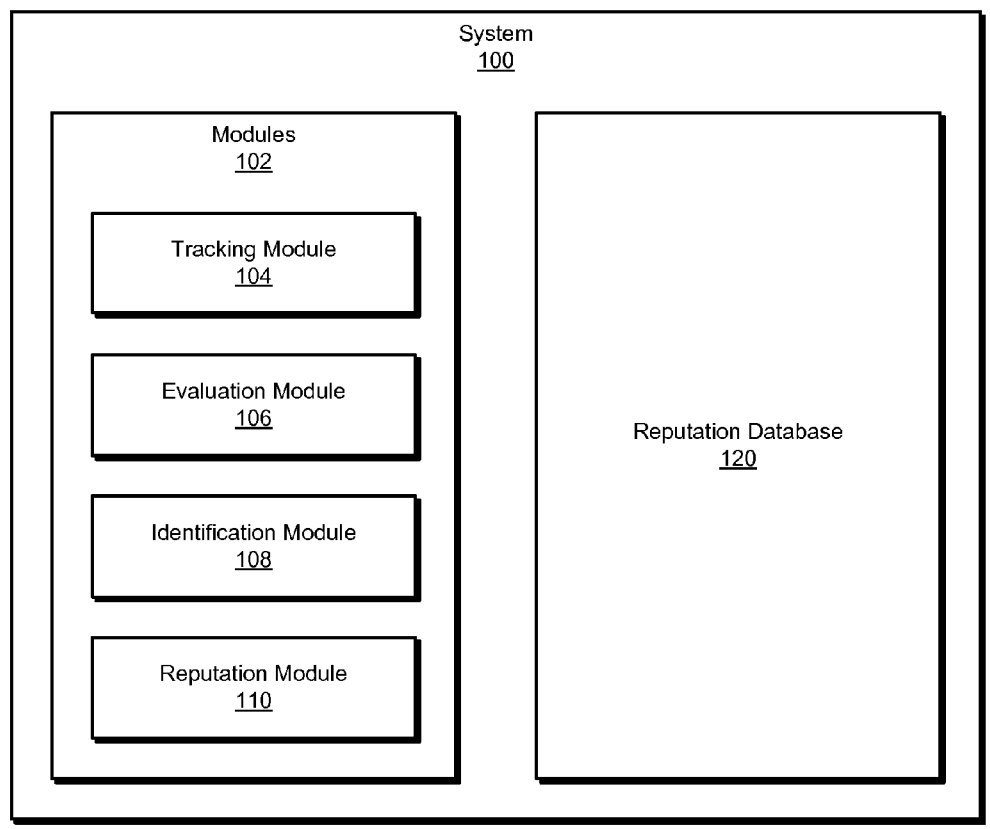
FIG. 1 is a block diagram of an exemplary system for establishing reputations of files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for establishing reputations of files. As will be explained in greater detail below, systems and methods described herein may provide a more accurate assessment of file reputation by tracking the health of a computing system over time, identifying changes in the health of the system, and basing the reputation of files found on the computing system with the health of the system during the time periods the files were present. Systems and methods described herein may prove especially beneficial in helping to establish the reputation of new or less prevalent files.

The following will provide, with reference to FIGS. 1-2, 4, and 5, detailed descriptions of exemplary systems for establishing reputations of files. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for establishing reputations of files. As illustrated in this figure, exemplary system 100 may include one or more modules 102 for performing one or more tasks. For example, and as will be explained in greater detail below, exemplary system 100 may also include a tracking module 104 that may track the health of a computing system over time by, for each time period in a plurality of time periods, calculating a health metric that may be indicative of the computing system's health during the time period. Exemplary system 100 may additionally include an evaluation module 106 that may evaluate the health metrics of the plurality of time periods to identify an anomalous time period during which the health of the computing system changed. Exemplary system 100 may also include an identification module 108 that may locate at least one file that may be present on the computing system during the anomalous time period and may be absent from the computing system during at least one other time period from the plurality of time periods. Exemplary system 100 may additionally include a reputation module 110 that may base a reputation for the file on an association between the file and the computing system that includes the anomalous time period and excludes the other time period such that the reputation for the file may be based at least in part on the health metric for the anomalous time period and may be not based on the health metric for the other time period. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., backend 202 and/or reputation server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as reputation database 120. In one example, reputation database 120 may be configured to store data (such as reputation scores 208 in FIG. 2) that indicates the trustworthiness of various objects or entities, such as files or file publishers. Reputation database 120 may represent portions of a single database or computing device or a plurality of databases or computing devices. For example, reputation database 120 may represent a portion of a backend 202 or reputation server 206 in FIG. 2, computing system 610 in FIG. 6, and/or portions of exemplary network architecture 700 in FIG. 7. Alternatively, reputation database 120 in FIG. 1 may represent one or more physically separate devices capable of being accessed by a computing device, such as reputation server 206 in FIG. 2, computing system 610 in FIG. 6, and/or portions of exemplary network architecture 700 in FIG. 7.

Figure 2:
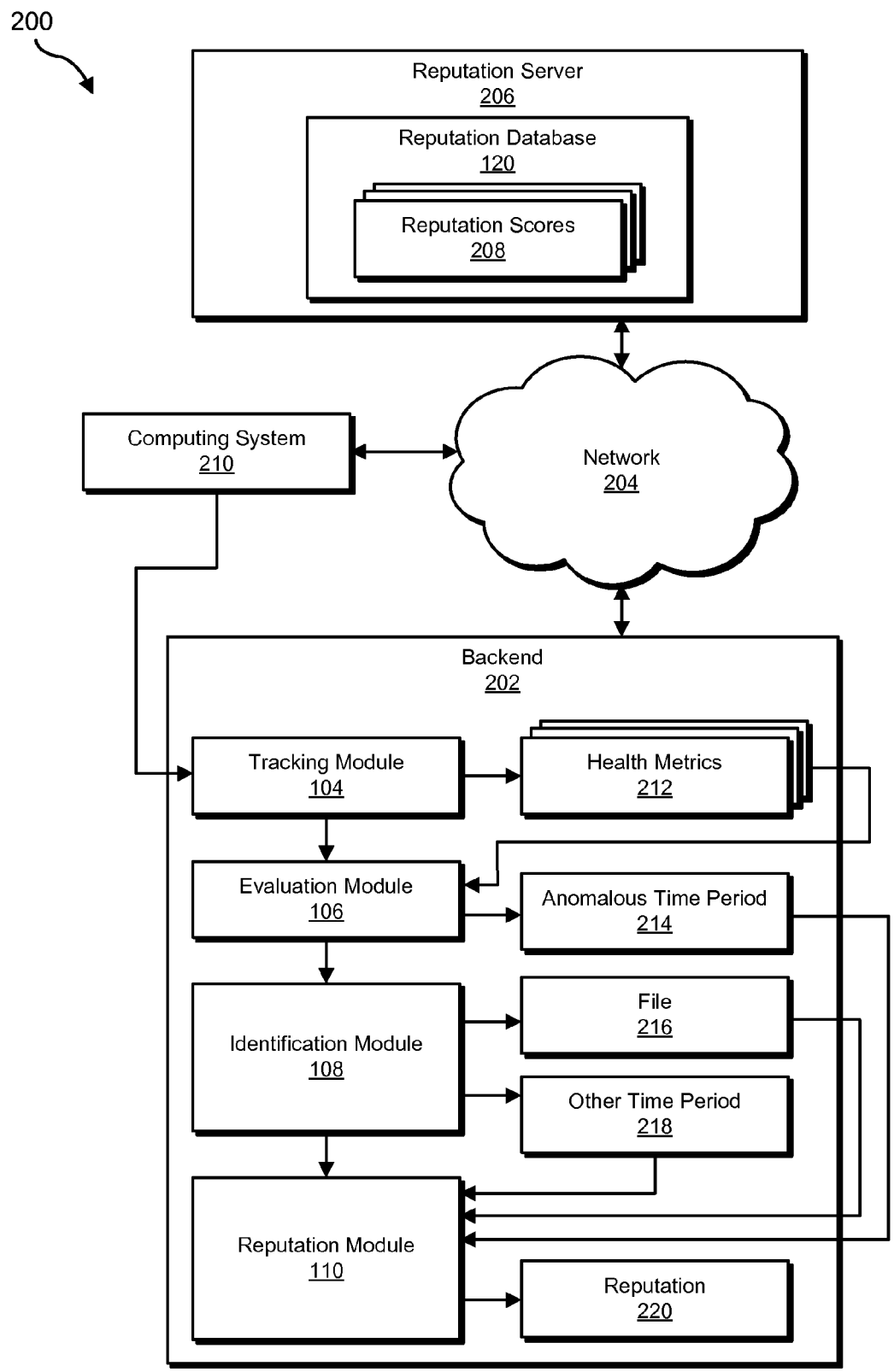
FIG. 2 is a block diagram of an additional exemplary system for establishing reputations of files.

Exemplary system 100 in FIG. 1 may be implemented in a variety of ways. For example, all or a portion of exemplary system 100 may represent portions of exemplary system 200 in FIG. 2. As shown in FIG. 2, system 200 may include a backend 202 in communication with a reputation server 206 via a network 204. In one example, backend 202 may be programmed with one or more of modules 102 and/or may store all or a portion of the data in reputation database 120. Additionally or alternatively, reputation server 206 and/or a computing system 210 may be programmed with one or more of modules 102 and/or may store all or a portion of the data in reputation database 120.

In one embodiment, one or more of modules 102 from FIG. 1 may, when executed by at least one processor of backend 202 and/or reputation server 206, enable backend 202 and/or reputation server 206 to establish reputations of files. For example, and as will be described in greater detail below, tracking module 104 may track the health of computing system 210 over time by, for each time period in a plurality of time periods, calculating health metrics 212 indicative of the health of computing system 210 during the time period. Evaluation module 106 may evaluate health metrics 212 of the plurality of time periods to identify anomalous time period 214 during which the health of computing system 210 changed. Identification module 108 may locate at least one file 216 that is present on computing system 210 during the anomalous time period 214 and is absent from computing system 210 during at least one other time period 218 from the plurality of time periods. Reputation module 110 may base reputation 220 for file 216 on an association between file 216 and computing system 210, that includes anomalous time period 214 and excludes other time period 218 such that reputation 220 for file 216 is based at least in part on a health metric from health metrics 212 for anomalous time period 214 and is not based on a health metric from health metrics 212 for other time period 218.

Backend 202 and reputation server 206 generally represent any type or form of computing device that is capable of storing, comparing, and/or providing data. Examples of backend 202 and reputation server 206 include, without limitation, application servers and database servers configured to provide various database services and/or run certain software applications. In some examples, and as illustrated in FIG. 2, backend 202 and reputation server 206 may represent separate and discrete computing devices. In other examples, however, backend 202 and reputation server 206 may represent portions of a single computing device, such as a device operated and maintained by a security software publisher.

Computing system 210 generally represents any type or form of computing device capable of reading computer-executable instructions. Examples of computing system 210 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between backend 202 and reputation server 206.

Figure 3:
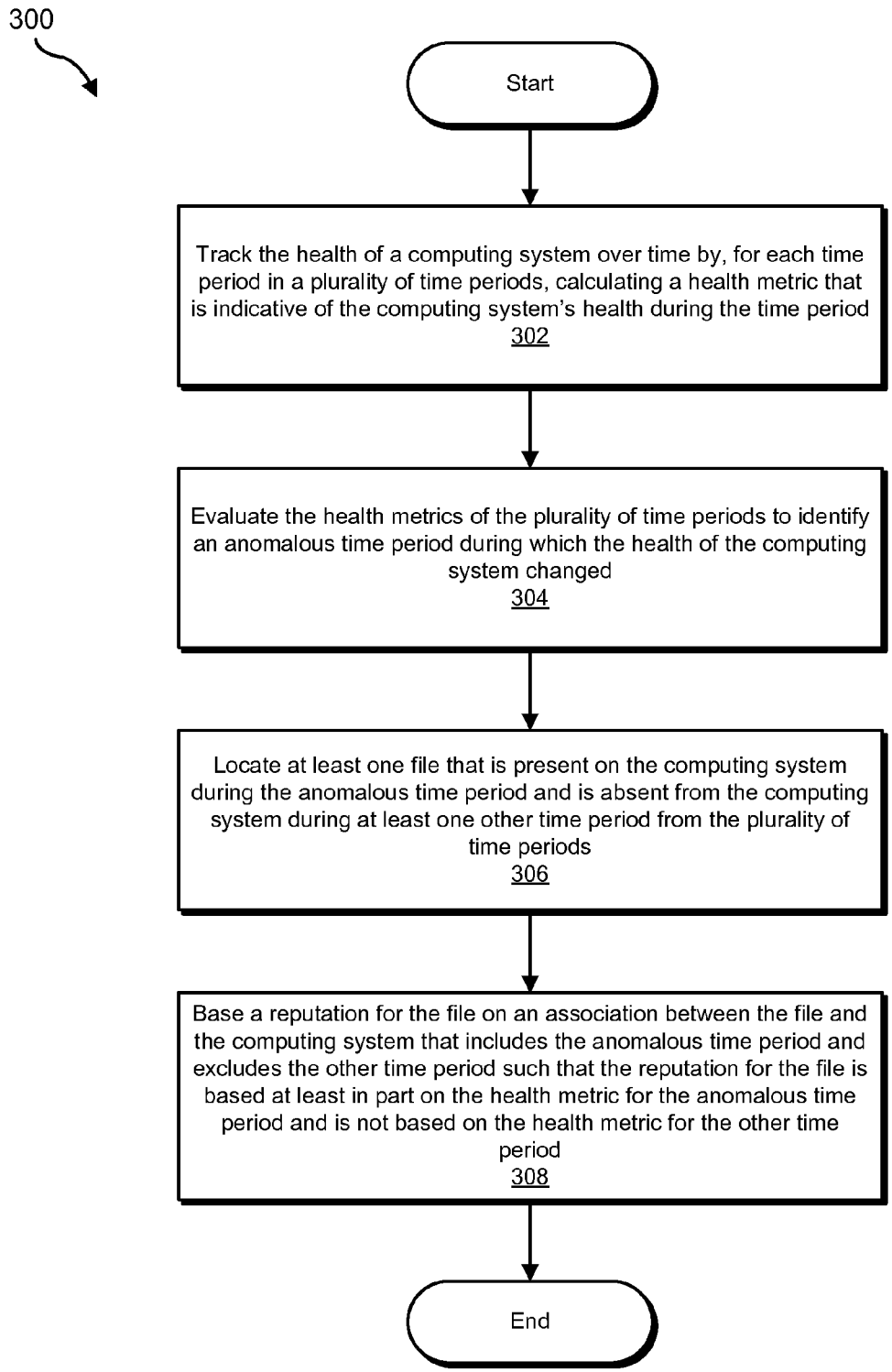
FIG. 3 is a flow diagram of an exemplary method for establishing reputations of files.

FIG. 3 is a flow diagram of an exemplary computer-implemented method 300 for establishing reputations of files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may track the health of a computing system over time by, for each time period in a plurality of time periods, calculating a health metric that is indicative of the computing system's health during the time period. For example, at step 302 tracking module 104 may, as part of backend 202 in FIG. 2, track the health of computing system 210 over time by, for each of several time periods, calculating health metrics 212 indicative of the computing system's health during the time period.

The term "health," as used herein, may refer to the performance, stability, and/or state of security of a computing system. The health of a computing system may be based on several factors, each of which may be quantified, weighted, and combined into a health metric or health score. Tracking module 104 may calculate health metrics 212 in a variety of ways. In some examples, the computing health of the computing system may be quantified as a numeric score that may be expressed as a number on a scale (e.g., 4 on a scale of 1 to 5), or as a percentage.

In some examples, tracking module 104 may track the health of the computing system over time by: (1) calculating the health metric for the computing system for a first fixed time period, (2) calculating the health metric for the computing system for a second fixed time period, (3) determining that the health metric for the second time period does not vary from the health metric of the first time period beyond a threshold, and (4) in response to determining that the health metrics of the two time periods do not vary beyond a threshold, combining the time periods into a single time period. For example, tracking module 104 may track the health of computing system 210 for two consecutive days, calculate a health metric for both days, and determine, based on the health metric not varying beyond a threshold percentage, the variance in the health metric between the two consecutive days. Tracking module 104 may then combine the two days into a single time period. Tracking module 104 may combine any number of time periods of any length of time to create a single time period during which the health of a computing system does not vary beyond a defined threshold.

In one example, tracking module 104 may monitor the health of computing system 210 on a continuous basis, combining consecutive time periods into a single time period until the health metric varies beyond a threshold value. Tracking module 104 may be implemented as a process that executes on computing system 210 to continuously monitor the health of the computing system locally until tracking module 104 determines that a significant change in the health metric has occurred. In some examples, and as will be described in greater detail below, tracking module 104 may communicate with evaluation module 106 to determine that the health metric for a time period is not anomalous.

As used herein, the terms "time period" and "period of time" generally refer to any duration or length of time. For example, a time period may be measured in seconds, days, weeks, etc. Time periods for which health metrics are calculated may be fixed-length time periods or may be time periods of different (i.e., variable) lengths. The length of a time period for which a health metric is calculated may be determined using any of a variety of heuristics, algorithms, and/or factors.

At step 304 one or more of the systems described herein may evaluate the health metrics of the plurality of time periods to identify an anomalous time period during which the health of the computing system changed. For example, at step 304 evaluation module 106 may, as part of backend 202 in FIG. 2, evaluate health metrics 212 of the plurality of time periods to identify anomalous time period 214 during which the health of the computing system 210 changed.

The term "anomalous," as used herein, generally refers to a variance in a health metric outside an expected range. In other words, a time period may be identified as an anomalous time period if computing system health during the time period varies from at least one other time period. For example, if the health metric is expressed as a number on a scale (such as 1 to 5), any change in the metric may be considered significant and anomalous. With a health metric expressed as a percentage, a variation of less than 5% (for example) may be considered to be within an expected range, and evaluation module 106 may only identify a greater change as anomalous.

An anomalous time period may be a period of time during which health of a computing system get better or worse. For example, an anomalous time period may be a time period during which a user who does not typically use a computing device (e.g., a child) uses the device and visits questionable websites or opens unsafe attachments. As another example, an anomalous time period may be a time period during which an otherwise healthy machine was infected with a virus.

Evaluation module 106 may identify an anomalous time period in the health of the computing system in a variety of ways. For example, in one embodiment, the health metrics may indicate that the health of the computing system is good before and/or after the anomalous time period and that the anomalous time period is a period of time that is short relative to the other period of time and is indicative of a spike of poor health on the computing system. Alternatively, the health metrics may indicate that the health of the computing system is poor before and/or after the anomalous time period and that the anomalous time period is a period of time during which the computing system has good health. While an anomalous time period may be short relative to one or more other time periods, an anomalous time period may also be the same length and/or longer that one or more other time periods.

At step 306, one or more of the systems described herein may locate at least one file that is present on the computing system during the anomalous time period and is absent from the computing system during at least one other time period from the plurality of time periods. For example, at step 306 identification module 108 may, as part of backend 202 in FIG. 2, locate at least one file 216 that is present on computing system 210 during anomalous time period 214 and is absent from computing system 210 during at least one other time period 218 from the plurality of time periods. As used herein, the term "file" generally refers to any executable file, data file, library file, and/or any other type or form of file found on a computing system.

Identification module 108 may identify one or more files present on the computing system during an anomalous time period (and absent during another time period) in any suitable manner. For example, identification module 108 may identify when a file was created on the computing system based on a file creation date. Identification module 108 may identify a time period previous to the time period in which the file was created as a time period in which the file was absent. Identification module 108 may also identify when the file was deleted based on a file deletion date on a deleted file in a Trashcan or Recycle Bin directory. In another example, identification module 108 may identify time periods when the file was present and absent on the computing system by referring to a security log for the computing system that records when a file is created, deleted, and/or scanned for malware.

At step 308 one or more of the systems described herein may base a reputation for the file on an association between the file and the computing system that includes the anomalous time period and excludes the other time period such that the reputation for the file is based at least in part on the health metric for the anomalous time period and is not based on the health metric for the other time period. For example, at step 308 reputation module 110 may, as part of backend 202 in FIG. 2, base reputation 220 for file 216 on an association between file 216 and computing system 210 that includes anomalous time period 214 and excludes other time period 218 such that reputation 220 for file 216 is based at least in part on a health metric for anomalous time period 214 and is not based on a health metric for other time period 218.

The term "reputation," as used herein, generally refers to information that indicates the trustworthiness of a file and/or whether the file represents a potential security risk. Factors that may be included in reputation may include measures of a file's prevalence in an organization or on a group of computing devices, the length of time the file has been in existence, the reliability of information concerning the file's origin, and/or a measure of how often the file is associated with forms of malware. Various factors that make up reputation may be quantified and weighted to yield a numerical value that may be referred to as a "reputation score."

Reputation module 110 may base a reputation for the file on time periods when the file was present on the computing system in a variety of ways. In one example, the health metric for the anomalous time period may indicate that the computing system had poor health during the anomalous time period, and the health metric for the other time period may indicate that the computing system had good health during the other time period. Reputation module 110 may then determine that the reputation for the file indicates that the file is potentially malicious. In another example, the health metric for the anomalous time period may indicate that the computing system had good health during the anomalous time period, and the health metric for the other time period may indicate that the computing system had poor health during the other time period. Reputation module 110 may then determine that the reputation for the file indicates that the file is safe.

In one example, the reputation of the file may be unknown before the file is associated with the anomalous time period of the computing system. Reputation module 110 may calculate a health metric for the computing system during the anomalous time period by (1) identifying at least one additional file present on the computing system during the time period, (2) identifying a reputation for the additional file, (3) basing the health metric, at least in part, on the reputation of the additional file, and (4) calculating the health metric for the computing system for the time period based on the reputation of the file.

In some examples, reputation module 110 may base a reputation for the file on the association between the file and the computing system during the anomalous time period by: (1) generating a graph with a file node representing the file and a set of time period nodes representing each of the time periods, where the time period nodes are connected by edges to the file node according to the time period the file was present on the computing system, (2) determining a prior for each time period node in the graph, based on an assessment of a likelihood of the computing system becoming infected by malware during the time period, (3) determining a prior for the file node in the graph based on an assessment of a likelihood of the file being malware, (4) determining an edge potential for each edge in the graph based on a relationship between nodes connected by the edge, (5) iteratively propagating a probability of the file being malware among the nodes by transmitting messages along the edges in the graph, where the message transmitted by the node is generated based on the prior of the node and messages received by the node during any previous iteration, and (6) determining a reputation for the file, based on the probability associated with the corresponding file node. An example of this process is given in detail below.

The term "graph," as used herein, generally refers to a representation of a set of nodes connected by edges. While graphs may be configured in a variety of ways, examples provided herein divide the nodes in the graphs into two disjoint subsets: time period nodes and file nodes. The graphs provided in these examples are therefore more specifically known as "bipartite graphs" or "bigraphs." The term "prior," as used herein, generally refers to data associated with a node in a graph that represents prior knowledge about the node. A prior may include various forms of data, such as a single value, a set of values, or a function. In a procedure operating on a graph, priors may be set to initial values that may be modified as the procedure is executed. The value of a prior at any given time may then be considered to be a state, representing all cumulative knowledge associated with the node, from the initial state, through each step or iteration of the procedure. For example, a graph may include a node representing a bank account balance. The prior associated with the node may be assigned an initial value for the account balance at the beginning of a simulation. As the simulation progresses, the node may receive transactions from other nodes in the graph representing debits or credits to the account. At any given point in the simulation, the prior for the bank account node represents the cumulative effect on the account balance of all transactions received.

The term "message," as used herein, generally refers to data passed between adjacent nodes in a graph, along edges. Messages transform prior data associated with the node receiving the message, according to prior data associated with the node sending the message. In the bank account example above, messages represent transactions sent to the bank account from neighboring nodes. A message may be transformed as it is sent from a sending node to a receiving node by an edge potential associated with the edge along which the message is sent. The term "edge potential," as used herein, generally refers to a function associated with an edge in a graph that transforms a node's incoming messages to the node's outgoing messages.

Figure 4:
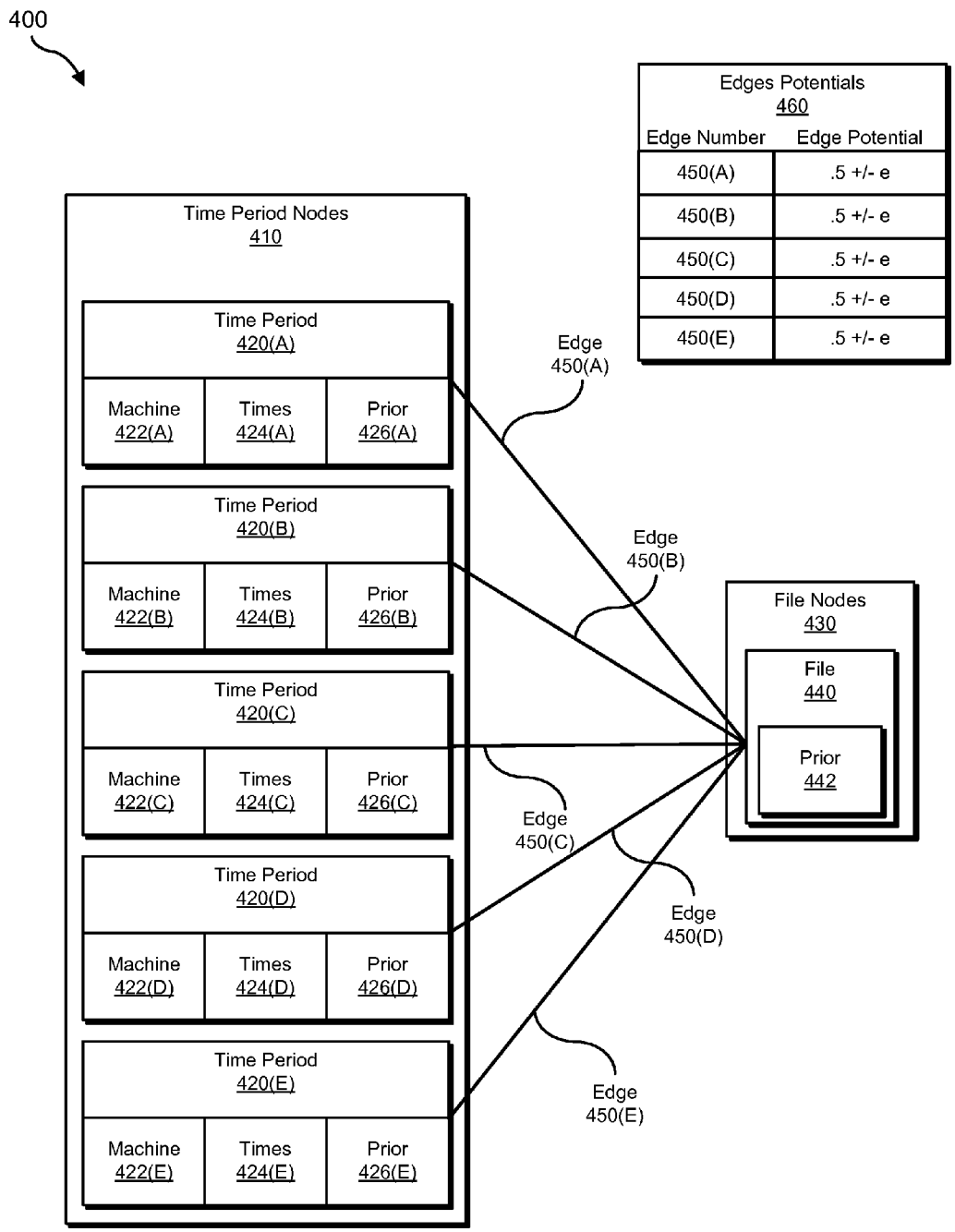
FIG. 4 is a block diagram of an exemplary system for graphing a file node to time period nodes.

FIG. 4 is a block diagram of an exemplary system 400 for graphing a file node to time period nodes. Exemplary system 400 may include time period nodes 410 and file nodes 430. In the example depicted, there are five time period nodes, 420(A)-420(E), and one file node 440. Each time period node includes a machine identifier 422 that identifies the computing device, times 424 that identifies the start time and end time for the time period, and a prior 426 that indicates the probability that the computing device was infected with malware during the time period. Edges 450(A)-450(E) connect file node 440 to each of the time period nodes 420, indicating that the file was present on the computing device during the time period. Each edge 450 has an associated edge potential, as indicated in the edge potentials table 460.

Edge potentials and initial values for priors in the graph may be based on knowledge of the domain and intuitive understanding of the relationships between the computing systems and the presence of files during various time periods. For example, the edge potential for each edge may transform messages by determining whether the reputation of adjacent nodes may be considered good or bad based on the reputation probability being above or below a reputation threshold, such as 0.5 or 50 percent. As message are transmitted along adjacent nodes, the edge potential function may transform the message based on the understanding that files with a good reputation are more likely to be associated with good-reputation computing devices than with bad-reputation computing devices by adding or subtracting an edge potential factor, identified as e in edge potentials table 460 in FIG. 4. The edge potential function may multiply the prior from the sending node by 0.5+e when priors of the adjacent nodes have the same reputation (both good or both bad), and by 0.5−e when priors of the adjacent nodes have different reputations (one good and one bad).

Reputation module 110 may set priors for time period nodes according to reputation scores for the computing device during the time period. Reputation module 110 may set priors for known file nodes according to the file's reputation, for example, 0.99 for known good files and 0.01 for known bad files. For unknown files, reputation module 110 may set the prior based on the observations of the file's prevalence.

The process for iteratively propagating probabilities throughout the graph may include, for each iteration, sending the prior for each time period node as a message to each adjacent file node in the graph, transforming the message using the edge potential associated with the edge as the message is transmitted and recalculating the reputation for each time period node based on the reputation of adjacent file node. Reputation module 110 may determine when to terminate the iterative process in a variety of ways. In one embodiment, iteratively propagating the probabilities terminates when (1) the probability for the file node converges within a threshold value, (2) a predetermined number of iterations have been completed, and/or (3) a true positive rate of malware is correctly classified based on the probability associated with the corresponding file node in the graph. Classification module 110 may terminate the iterative process upon classifying a true positive rate of malware to leverage the presence of known good and/or known bad files in the graph to infer the probabilities that unknown files include malware.

Figure 5:
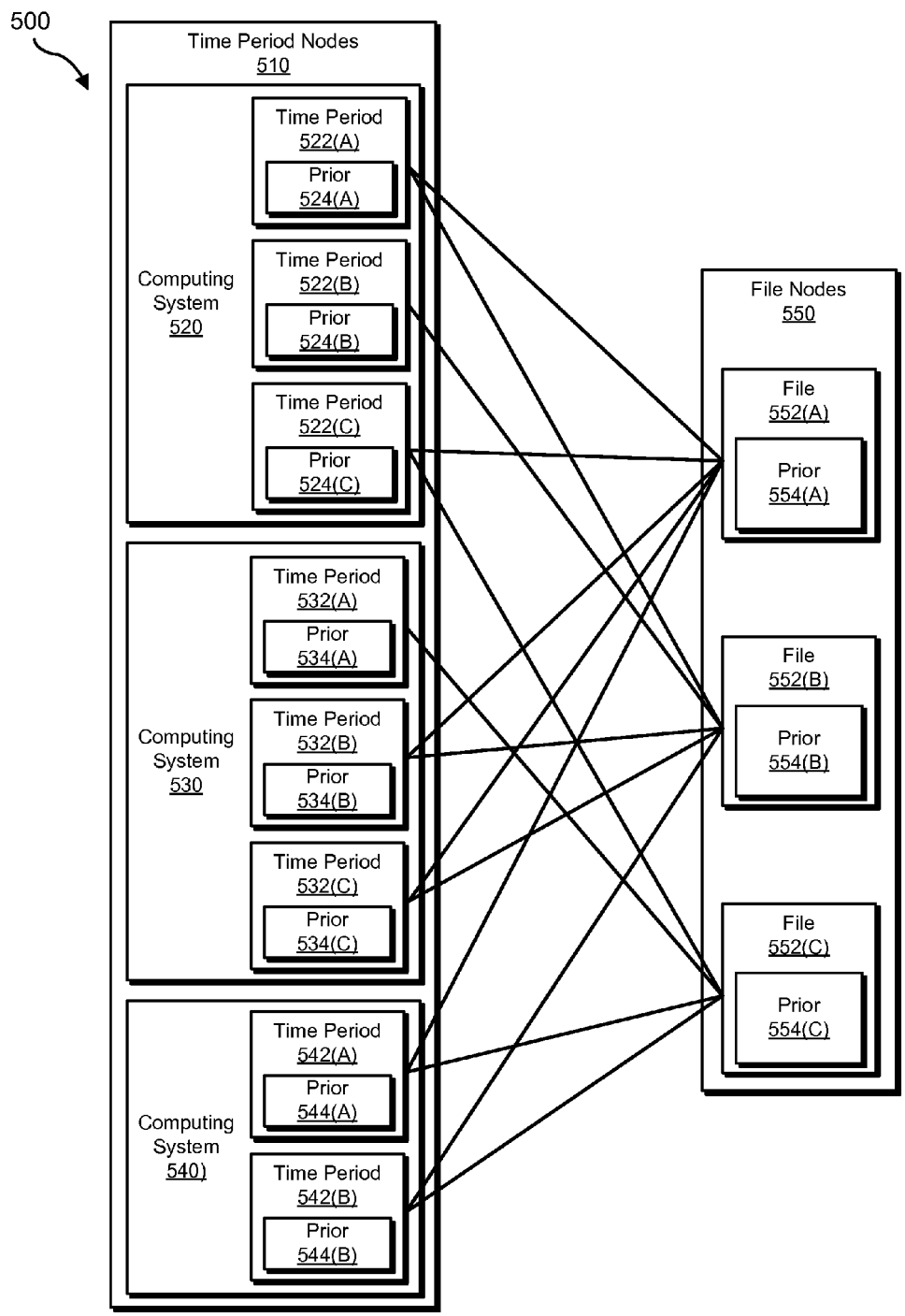
FIG. 5 is a block diagram of an exemplary system for graphing multiple file nodes to time period nodes associated with multiple computing systems.

Although the graph in FIG. 4 depicts only one file node and a few time period nodes, systems and methods described herein may scale to include very large numbers of file nodes and time period nodes. In one embodiment, the graph may include time period nodes representing time periods from multiple computing systems where the file was present during at least one time period. FIG. 5 is a block diagram of an exemplary system 500 for graphing multiple file nodes to time period nodes associated with multiple computing systems. Exemplary system 500 may include time period nodes 510 from multiple computing systems 520, 530, and 540. As depicted, time period nodes 522(A)-522(C), with priors 524(A)-524(C), are associated with computing system 520. Time period nodes 532(A)-532(C), with priors 534(A)-534(C), are associated with computing system 530. Time period nodes 542(A) and 542(B), with priors 544(A) and 524(B), are associated with computing system 540. File nodes 550 include file node 552(A)-552(C) with priors 554(A)-554(C) are connected along edges to time period nodes 510 on which each file occurs.

As explained above, the systems and methods described herein may establish reputations of files by tracking the health of a computing system over time. Systems and methods described herein may identify changes in the computer system's health and then base the reputation of files identified on the computing system with the health of the computing system at the time they were present on the computing system. By propagating the reputations of known files and computing systems to unknown files, systems and methods described herein may establish a reputation for low prevalence or previously unencountered files. The systems and methods described herein may also update and/or maintain reputations for files that are already known or that have high prevalence.

By tracking the health of a computing system over time, systems and methods described herein may capture the dynamic nature of computing system health. Computing systems may be subject to varying threat levels associated with the habits of different users that use the computing system at different points in time. Computing systems may also be targeted for attack during some time periods. Faulty operating system patches may create a system vulnerability in one time period that another patch may close in a later time period. By tracking these changes in security posture, systems and methods described herein may establish the reputation of unknown files sooner and more accurately than traditional system.

Figure 6:
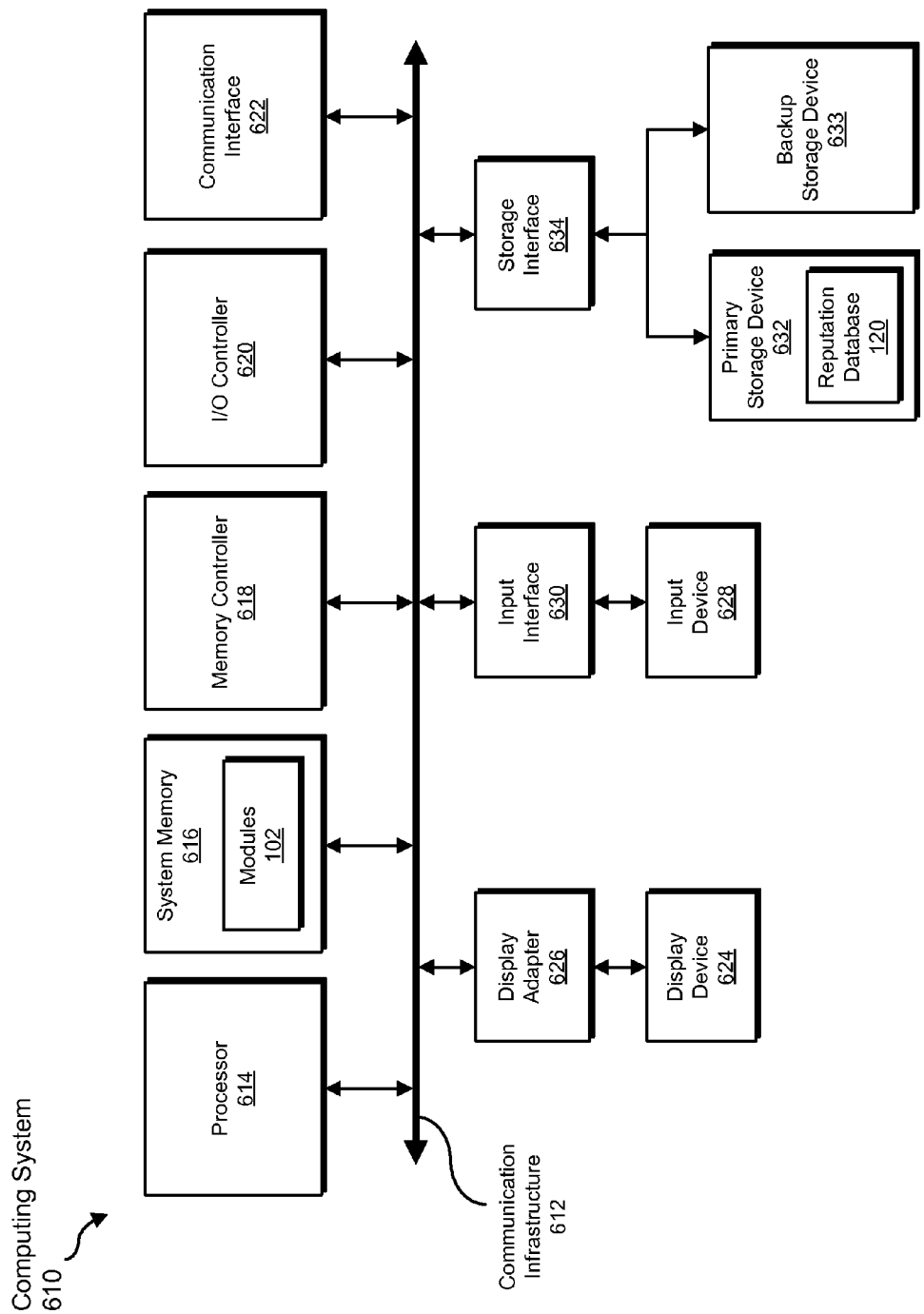
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, reputation database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
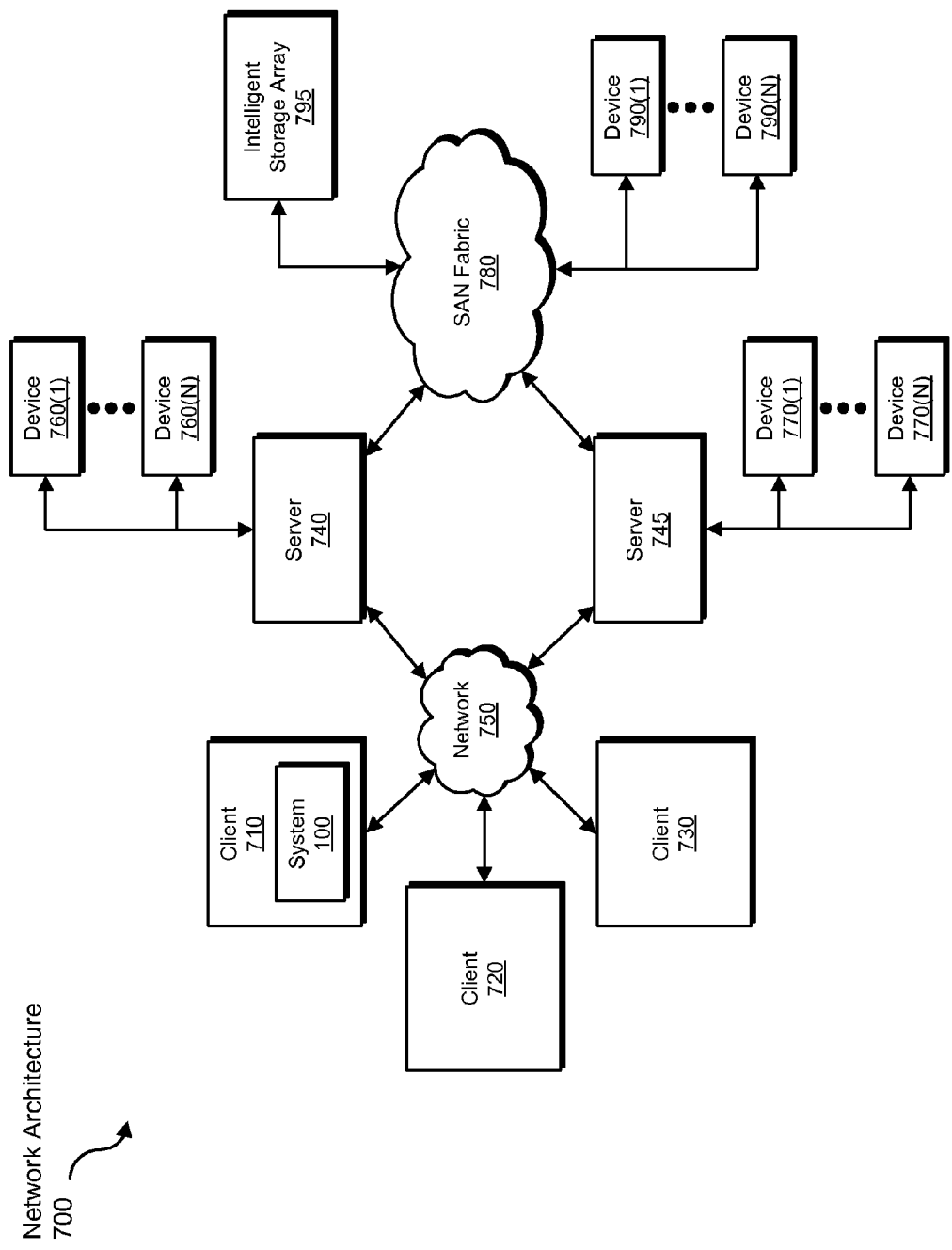
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for establishing reputations of files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may receive data to be transformed, transform the data, use the result of the transformation to calculate health metrics indicative of the health of a computing system during one or more time periods, and store the result of the transformation to track the health of the computing system over time. Additionally or alternatively, one or more of the modules recited herein may receive data to be transformed, transform the data, use the result of the transformation to establish the reputation of files, and store the result of the transformation to classify the files for later reference. Modules described herein may also transform a physical computing system into a system for establishing the reputation of files. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for establishing reputations of files, at least a portion of the method being performed by a computing device comprising at least one processor, the method comprising:

executing a process on a computing system to track the health of the computing system over time by, for each time period in a plurality of time periods, calculating a health metric that is indicative of the computing system's health during each time period in the plurality of time periods, the health of the computing system reflecting a state of security of the computing system;

evaluating the health metric of each time period in the plurality of time periods to identify an anomalous time period during which the health of the computing system changed;

locating at least one file that is present on the computing system during the anomalous time period and is absent from the computing system during at least one other time period from the plurality of time periods;

basing a reputation for the file on an association between the file and the computing system that includes the anomalous time period and excludes the at least one other time period such that the reputation for the file is based at least in part on the health metric for the anomalous time period and is not based on the health metric for the at least one other time period.

2. The computer-implemented method of claim 1, wherein:
the health metric for the anomalous time period indicates that the computing system had poor health during the anomalous time period;
the health metric for the at least one other time period indicates that the computing system had good health during the at least one other time period;
the reputation for the file indicates that the file is potentially malicious.

3. The computer-implemented method of claim 2, wherein:
the health metric of the time period before the anomalous time period and the health metric of the time period after the anomalous time period indicate that the computing system had good health before and after the anomalous time period;
the anomalous time period comprises a period of time that is shorter than the at least one other period of time and is indicative of a spike of poor health on the computing system.

4. The computer-implemented method of claim 1, wherein:
the health metric for the anomalous time period indicates that the computing system had good health during the anomalous time period;
the health metric for the at least one other time period indicates that the computing system had poor health during the at least one other time period;
the reputation for the file indicates that the file is safe.

5. The computer-implemented method of claim 1, wherein:
the file does not have an established reputation before the file is associated with the anomalous time period of the computing system;
calculating the health metric that is indicative of the computing system's health during the anomalous time period comprises:
identifying at least one additional file present on the computing system during the anomalous time period;
identifying a reputation for the additional file;
basing the health metric for the anomalous time period, at least in part, on the reputation of the additional file.

6. The computer-implemented method of claim 1, wherein basing the reputation for the file on the association between the file and the computing system during the anomalous time period comprises:
generating a graph comprising a file node representing the file and a set of time period nodes representing each time period in the plurality of time periods, wherein the time period nodes are connected through edges to the file node according to the time period the file was present on the computing system;
determining a prior for each time period node in the graph, based on an assessment of a likelihood of the computing system becoming infected by malware during the time period;
determining a prior for the file node in the graph based on an assessment of a likelihood of the file being malware;
determining an edge potential for each edge in the graph based on a relationship between nodes connected by the edge;
iteratively propagating a probability of the file being malware among the nodes by transmitting messages from each node along the edges in the graph, wherein each message transmitted by the node is generated based on the prior of the node and messages received by the node during any previous iteration;
determining the reputation for the file based on a probability associated with a corresponding file node in the graph that corresponds to the file.

7. The computer-implemented method of claim 6, wherein iteratively propagating the probability terminates when at least one of:
the probability for the file node converges within a threshold value;
a predetermined number of iterations have been completed;
a true positive rate of malware is correctly classified based on the probability associated with the corresponding file node in the graph.

8. The computer-implemented method of claim 7, wherein the graph comprises time period nodes representing time periods from multiple computing systems where the file was present on at least one of the computing systems during at least one time period in the plurality of time periods.

9. The computer-implemented method of claim 1, wherein tracking the health of the computing system over time comprises:
calculating the health metric for the computing system for a first fixed time period;
calculating the health metric for the computing system for a second fixed time period;
determining that the health metric for the second time period does not vary from the health metric of the first time period beyond a threshold;
in response to determining that the health metrics of the first and second fixed time periods do not vary beyond a threshold, combining the first and second fixed time periods into a single time period, wherein the single time period comprises the at least one other time period.

10. A system for establishing reputations of files, the system comprising:
a tracking module, stored in a memory, that executes a process on a computing system to track the health of a computing system over time by, for each time period in a plurality of time periods, calculating a health metric that is indicative of the computing system's health during each time period in the plurality of time periods, the health of the computing system reflecting a state of security of the computing system;
an evaluation module, stored in the memory, that evaluates the health metrics of each time period in the plurality of time periods to identify an anomalous time period during which the health of the computing system changed;
an identification module, stored in the memory, that locates at least one file that is present on the computing system during the anomalous time period and is absent from the computing system during at least one other time period from the plurality of time periods;
a reputation module, stored in the memory, that bases a reputation for the file on an association between the file and the computing system that includes the anomalous time period and excludes the at least one other time period such that the reputation for the file is based at least in part on the health metric for the anomalous time period and is not based on the health metric for the at least one other time period;
at least one physical processor configured to execute the tracking module, the evaluation module, the identification module, and the reputation module.

11. The system of claim 10, wherein:
the health metric for the anomalous time period indicates that the computing system had poor health during the anomalous time period;

the health metric for the at least one other time period indicates that the computing system had good health during the at least one other time period;
the reputation for the file indicates that the file is potentially malicious.

12. The system of claim 11, wherein:
the health metric of the time period before the anomalous time period and the health metric of the time period after the anomalous time period indicate that the computing system had good health before and after the anomalous time period;
the anomalous time period comprises a period of time that shorter than the at least one other period of time and is indicative of a spike of poor health on the computing system.

13. The system of claim 10, wherein:
the health metric for the anomalous time period indicates that the computing system had good health during the anomalous time period;
the health metric for the at least one other time period indicates that the computing system had poor health during the at least one other time period;
the reputation for the file indicates that the file is safe.

14. The system of claim 10, wherein:
the file does not have an established reputation before the file is associated with the anomalous time period of the computing system;
the tracking module calculates the health metric that is indicative of the computing system's health during the anomalous time period by:
identifying at least one additional file present on the computing system during the anomalous time period;
identifying a reputation for the additional file;
basing the health metric for the anomalous time period, at least in part, on the reputation of the additional file.

15. The system of claim 10, wherein the reputation module bases the reputation for the file on the association between the file and the computing system during the anomalous time period by:
generating a graph comprising a file node representing the file and a set of time period nodes representing each time period in the plurality of time periods, wherein the time period nodes are connected through edges to the file node according to the time period the file was present on the computing system;
determining a prior for each time period node in the graph, based on an assessment of a likelihood of the computing system becoming infected by malware during the time period;
determining a prior for the file node in the graph based on an assessment of a likelihood of the file being malware;
determining an edge potential for each edge in the graph based on a relationship between nodes connected by the edge;
iteratively propagating a probability of the file being malware among the nodes by transmitting messages from each node along the edges in the graph, wherein each message transmitted by the node is generated based on the prior of the node and messages received by the node during any previous iteration;
determining the reputation for the file based on a probability associated with a corresponding file node in the graph that corresponds to the file.

16. The system of claim 15, wherein iteratively propagating the probability terminates when at least one of:

the probability for the file node converges within a threshold value;
a predetermined number of iterations have been completed;
a true positive rate of malware is correctly classified based on the probability associated with the corresponding file node in the graph.

17. The system of claim 16, wherein the graph comprises time period nodes representing time periods from multiple computing systems where the file was present on at least one of the computing systems during at least one time period in the plurality of time periods.

18. The system of claim 10, wherein the tracking module tracks the health of the computing system over time by:
calculating the health metric for the computing system for a first fixed time period;
calculating the health metric for the computing system for a second fixed time period;
determining that the health metric for the second time period does not vary from the health metric of the first time period beyond a threshold;
in response to determining that the health metrics of the first and second fixed time periods do not vary beyond a threshold, combining the first and second fixed time periods into a single time period, wherein the single time period comprises the at least one other time period.

19. A non-transitory computer-readable medium comprising one or more computer-readable instructions that, when executed by at least one processor of a computing device, cause the computing device to:
execute a process on a computing system to track the health of the computing system over time by, for each time period in a plurality of time periods, calculating a health metric that is indicative of the computing system's health during each time period in the plurality of time periods, the health of the computing system reflecting a state of security of the computing system;
evaluate the health metric of each time period in the plurality of time periods to identify an anomalous time period during which the health of the computing system changed;
locate at least one file that is present on the computing system during the anomalous time period and is absent from the computing system during at least one other time period from the plurality of time periods;
base a reputation for the file on an association between the file and the computing system that includes the anomalous time period and excludes the at least one other time period such that the reputation for the file is based at least in part on the health metric for the anomalous time period and is not based on the health metric for the at least one other time period.

20. The non-transitory computer-readable medium of claim 19, wherein:
the health metric for the anomalous time period indicates that the computing system had poor health during the anomalous time period;
the health metric for the at least one other time period indicates that the computing system had good health during the at least one other time period;
the reputation for the file indicates that the file is potentially malicious.

* * * * *